Aug. 24, 1965   V. A. HORDIS ETAL   3,201,832
HERMETICALLY SEALED WINDOW AND BLIND UNIT
Filed March 4, 1963   2 Sheets-Sheet 1
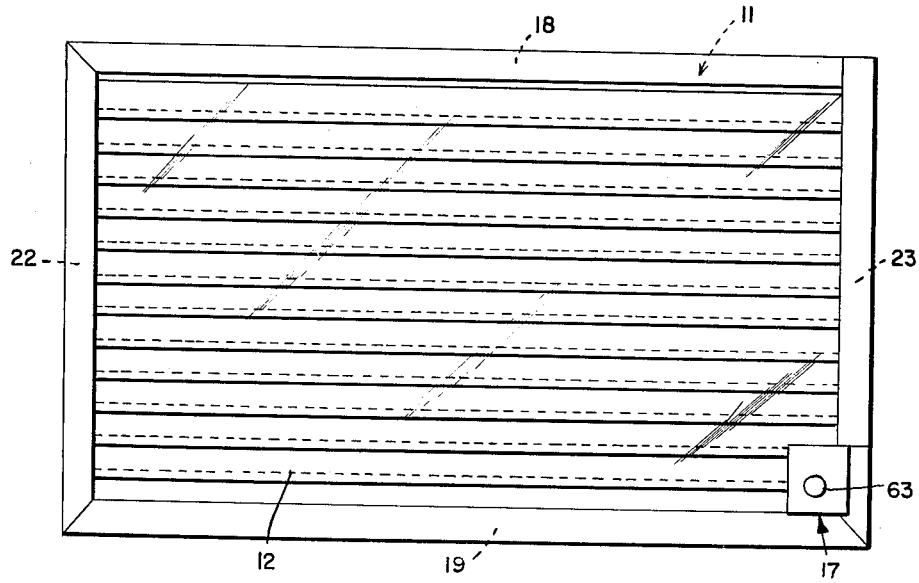
FIG. 1.
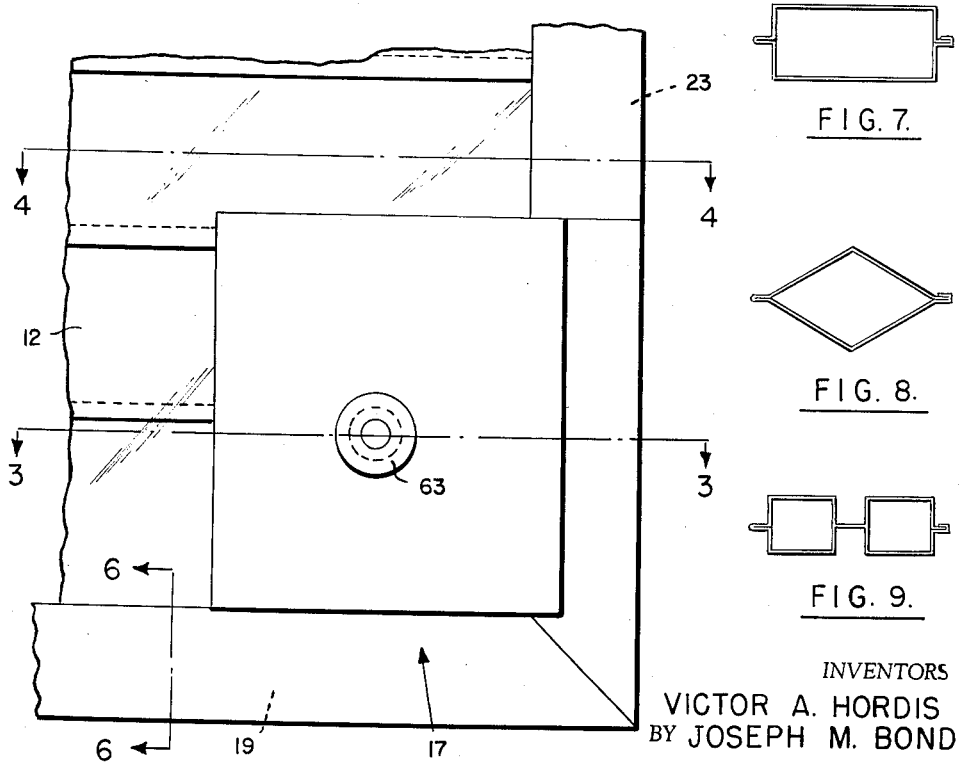
FIG. 2.
FIG. 7.
FIG. 8.
FIG. 9.
INVENTORS
VICTOR A. HORDIS
BY JOSEPH M. BOND
John F. A. Earley
ATTORNEY Aug. 24, 1965    V. A. HORDIS ETAL    3,201,832
HERMETICALLY SEALED WINDOW AND BLIND UNIT
Filed March 4, 1963    2 Sheets-Sheet 2

INVENTORS
VICTOR A. HORDIS
BY JOSEPH. M. BOND

John F. A. Easley
ATTORNEY

United States Patent Office 3,201,832
Patented Aug. 24, 1965

3,201,832
HERMETICALLY SEALED WINDOW AND BLIND UNIT
Victor A. Hordis, Riverton, N.J., and Joseph M. Bond, Jenkintown, Pa., assignors to Polarpane Corporation, Pennsauken, N.J., a corporation of New Jersey
Filed Mar. 4, 1963, Ser. No. 262,619
3 Claims. (Cl. 20—56.5)

This invention relates to improvements in window structure, and more particularly concerns an improved combined insulating window and blind unit which controls the admission of solar heat and light and requires little or no maintenance.

It has long been desired to provide a window structure which has good inexpensive sun control, and various proposals have been made heretofore.

For example, tinted, heat-absorbing glass has been tried, but has been found expensive and not too effective. Tinted glass excludes some of the solar heat and light in the summertime, but it also excludes solar heat and light in the wintertime when such exclusion is not desired.

Another proposed solution has been to mount louvers outside the windows of a building. However, outside louvers are expensive and unattractive in appearance.

Another proposed solution has been to provide Venetian blinds mounted inside the space between two panes of glass in an insulating window unit. Such arrangements have conventionally utilized a crank shaft which penetrated into the space between the glass panes. The sealing of this shaft has presented a very difficult problem because a hermetical seal is necessary in order to provide the insulating dead air space and to prevent dust and moisture from accumulating in the space between the panes.

Accordingly, it is an object of this invention to provide a combined window and blind unit which overcomes the aforementioned problems and disadavantages.

It is another object of this invention to provide a combined window and blind unit which is hermetically sealed, which controls the admission of solar heat and light, and which is operable from outside the unit.

Other objects and advantages of this invention, including its simplicity and economy, will further become apparent hereinafter and in the drawings, in which:

FIG. 1 is a view in front elevation of a combined window and blind unit constructed in accordance with this invention;

FIG. 2 is a view on an enlarged scale, in front elevation, of the exterior of the operating means which forms a part of this invention;

Figure 3:
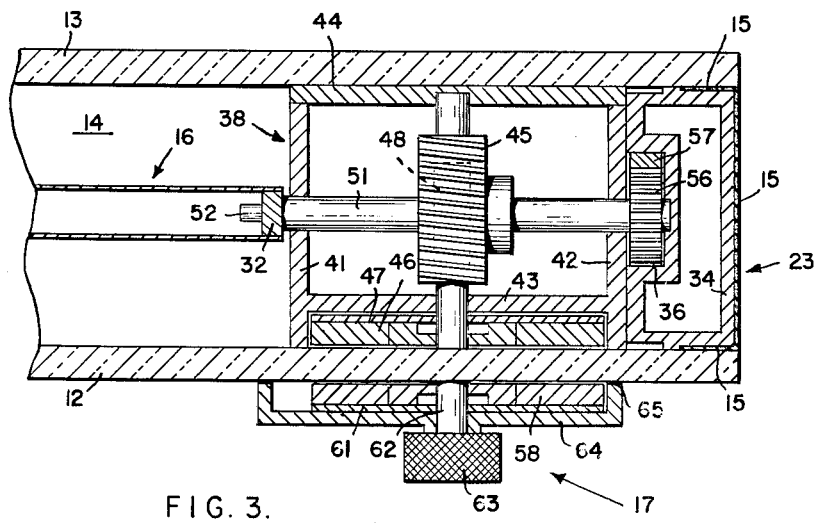
FIG. 3 is a view in section taken as indicated by the lines and arrows 3—3 which appear in FIG. 2.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a combined insulating window and blind unit which includes a divider frame 11, an inside glass pane 12 and an outside glass pane 13 mounted on frame 11 and defining a dead air space 14 therebetween, a seal 15 (preferably made of polysulfide, though any other sealant material or means of sealing may be used) which completely seals the edges of glass panes 12 and 13 to the frame 11 to hermetically seal the unit, a series of rotatable slats 16 positioned in dead air space 14 and mounted between a pair of opposed frame members, and operating means 17 operatively connected to slats 16 for rotating the slats to a desired angle so as to admit or exclude light and heat.

Figure 6:
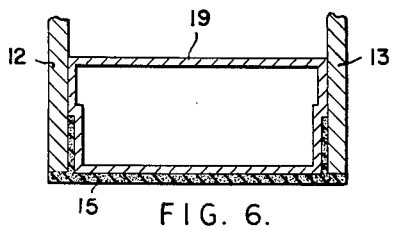
FIG. 6 is a view in section taken as indicated by the lines and arrows 6—6 which appear in FIG. 2, and FIGS. 7–9 are views in section of modified forms of the slat.

Divider frame 11 includes top and bottom frame members 18, 19 which are joined together by horizontally spaced-apart upright or side members 22, 23. The frame members are preferably extruded from aluminum, and frame members 18, 19, and 22 have the same cross section (which is illustrated in FIG. 6). Side member 23 is the operating frame member and has the cross section illustrated in FIGS. 3 and 4. It will be seen that side member 23 contains part of the operating mechanism for positioning slats 16 at a desired angle.

Figure 5:
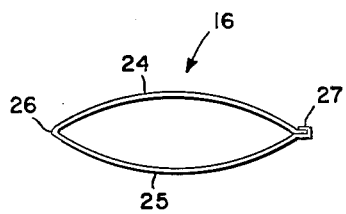
FIG. 5 is a view in section taken as indicated by the lines and arrows 5—5 which appear in FIG. 4.

Slats 16 are hollow and are substantially oval-shaped in cross section as is shown in FIG. 5. A top side 24 and a bottom side 25 are joined together at their longitudinal edges by a bend 26 in the metal (slats 16 are preferably made of aluminum) and an overlapping edge 27. Because of this construction, slats 16 are exceptionally rigid and span a considerable distance without sagging. FIGS. 7–9 show modified forms of slats: FIG. 7 showing a slat with a rectangular cross section; FIG. 8 showing a diamond cross section, and FIG. 9 showing a double rectangle cross section.

A slat insert 28 (preferably made of a plastic having good bearing characteristics, such as nylon, though any material may be used) is mounted in one end of slats 16 and has a bearing pin 31 extending therefrom into a hole formed in side member 22. A slat insert 32 is mounted in the other end of slat 16. Insert 32 has a rectangular slot in its center. Into this slot is fitted a rectangular key which forms the end of bearing shaft 33. Bearing shaft 33 is supported by holes in side member 23. Member 23 includes a U-shaped hollow member 34 and a channel member 35. The legs and base of U-shaped member 34 define a hollow space 36. Shaft 33 has mounted thereon a spur gear 37 which is positioned in space 36 and forms part of the interior operating means.

Figure 4:
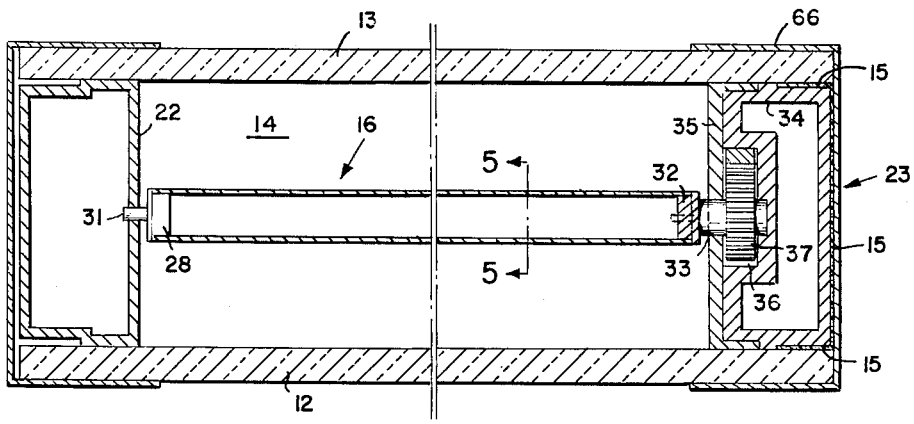
FIG. 4 is a view in section taken as indicated by the lines and arrows 4—4 which appear in FIG. 2.

The interior operating means is located between glass panes 12 and 13 and within divider frame 11. It includes a gear box housing 38 that is H-shaped and has posts 41, 42 connected by cross bar 43 (FIG. 3). Housing 38 is provided with a gear box cover 44 which is mounted adjacent to the inner surface of outside glass pane 13.

Gear box cover 44 and cross bar 43 support the shaft of a worm 45, that has mounted thereon an inside circular magnet 46 which is provided with a soft iron back-up ring or mounting plate 47. The outer vertical surface of circular magnet 46 is adjacent the inner surface of inside glass pane 12 but does not touch pane 12.

Below worm 45, a worm gear 48 is mounted so as to be in mesh with worm 45 and driven thereby. Worm gear 48 is provided with a press fitted or otherwise mounted shaft 51 that has a rectangular portion 52 which is slip fitted into a slat insert 32 of one of the slats 16 so that rotation of shaft 51 moves slat insert 32 to turn its slat to a desired position. Shaft 51 is supported in a hole in post 41 of gear box housing 38 at one end and in a hole in post 42 at the other end.

Worm gear shaft 51 projects into hollow space 36 in frame 23 and has a main driving gear 56 fastened to it inside of space 36. A rack 57 is also positioned within hollow space 36 and is provided with teeth which are in mesh with the teeth of main driving gear 56 and with the teeth of spur gears 37.

The exterior operating means includes an outside magnet 58, which is a circular magnet having a back-up ring or mounting plate 61, mounted on shaft 62 of operating knob 63. A housing 64 rotatably supports operating knob 63, and is fastened to the outside surface of glass pane 12 by a layer 65 of adhesive such as polysulfide, or the like.

A channel-shaped cover 66 is provided to cover the entire perimeter of the window, though cover 66 is shown in the drawings only on operating side member 23. Accordingly, none of the operating mechanism is seen from the outside of the window unit. Instead, there is presented to view only the slats extending between opposed frame members. It is to be noted that the slats may be positioned horizontally or vertically, as desired, by installing the window with operating frame member 23 in a vertical or horizontal position.

In operation, knob 63 is turned to rotate outside magnet 58 which causes the rotation of inside magnet 46. This rotates worm 45 to drive the worm gear 48 and its shaft 51 which turns slat insert 32 and its connected slat 16. Worm gear shaft 51 also turns main driving gear 56 to move rack 57. Movement of rack 57 causes rotation of spur gears 37 and they turn their associated slats 16 (FIG. 4) to the desired position.

The angular position of the lower slat 16 is changed by the turning of worm gear shaft 51. Changes in the angular position of the upper (or remaining) slats 16 are also made by the turning of shaft 51 to turn main driving gear 56 which moves rack 57 to turn spur gears 37.

The edges of slats 16 overlap to insure complete closure when the blind is closed and thereby exclude light and heat. The rigid structure of slats 16, with their substantially box beam cross-section, prevents any twisting of the slats 16 which might be caused by friction of bearing pin 31 in upright side member 22, and also prevents sagging or buckling.

The gear box is utilized in the transfer of power from inside circular magnet 46 to rack 57 so as to increase the low magnetic torque available from magnet 46 to a high enough torque to adequately do useful work, such as to move rack 57.

The sun control window unit of the present invention controls the admission of solar heat and energy as desired, and does so without breaking the hermetical seal of the unit. Moreover, when the slats are closed, it increases the insulation of the window unit because it provides two dead air spaces instead of the usual one, in that there is a dead air space between the outside pane and the slats, and another dead air space between the slats and the inside pane.

The blind, or rotatable louver, portion of the window unit is maintenance free. Since it is mounted in a dead air space, it does not corrode or deteriorate. Moreover, the elements of the interior driving mechanism are also hermetically sealed, and do not get dirty. They never have to be cleaned since dust and dirt do not penetrate the hermetical seal.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

We claim:

1. A combined window and blind unit comprising a divider frame having top and bottom frame members joined together by spaced-apart side members, an inside and outside glass pane mounted on the frame and defining a space therebetween, sealing means around said unit which hermetically seals it, a series of slats positioned in said space, a gear mounted on one end of each slat, a rack positioned in said unit so as to have teeth in mesh with teeth of the slat gears, interior operating means positioned in said space and operatively connected to said rack for moving said rack to cause rotation of said slat gears and slats, said interior operating means including an interior rotatable magnet mounted in said space, and exterior operating means mounted outside said space for operating said interior operating means, said exterior operating means including an exterior rotatable magnet mounted outside said space and magnetically connected to the interior magnet and adapted to drive said interior magnet and operating means.

2. The combined window and blind unit defined in claim 1, wherein gear means are connected between the interior rotatable magnet and said rack for increasing the low magnetic torque available from the interior rotatable magnet to a high enough torque to move said rack.

3. A combined window and blind unit comprising a divider frame having top and bottom frame members joined together by horizontally spaced-apart side members, an inside and an outside glass pane mounted on the frame and defining a dead air space therebetween, sealing means hermetically sealing said unit, a series of hollow rotatable slats positioned in said space and supported only at their ends, a gear box housing mounted in said space, a worm shaft supported by said housing with a worm mounted thereon, a driven circular magnet mounted on one end of the worm shaft and rotatable therewith, one face of said magnet being adjacent the interior surface of said inside pane, a worm gear shaft supported by said housing and positioned transversely to the worm shaft and having a worm gear in mesh with said worm, a driving spur gear mounted on said worm gear shaft, a rack having teeth in mesh with said driving spur gear, a series of slat-rotating spur gears connected to said slats and supported in said frame and in mesh with said rack so that movement of said rack rotates said slat-rotating spur gears to rotate said slats, a magnet housing mounted adjacent the exterior surface of said inside pane, and a shaft supported by said magnet housing and having an operating knob and a driving circular magnet mounted thereon and rotatable therewith, one face of said driving magnet being adjacent the exterior surface of said inside pane, whereby said driving magnet is adapted to be rotated by said knob to rotate said driven magnet to rotate said worm, worm gear, and driving spur gear to move said rack to rotate said slat-rotating spur gears and said slats.

References Cited by the Examiner

UNITED STATES PATENTS

| | | | |
|---|---|---|---|
| 1,827,718 | 10/31 | Whitney. | |
| 1,872,599 | 8/32 | Le Grand | 189—62 |
| 2,091,012 | 8/37 | Pratt. | |
| 2,169,873 | 8/39 | Clark. | |
| 2,281,071 | 4/42 | Knudsen | 20—56.5 |
| 2,514,323 | 7/50 | Ford | 310—104 |
| 2,537,733 | 1/51 | Brenner | 310—104 X |
| 2,631,339 | 3/53 | Pratt | 20—56.5 |
| 2,722,617 | 11/55 | Cluwen et al. | 317—201 X |
| 2,855,039 | 10/58 | Gross | 160—236 |
| 3,129,471 | 4/64 | Johnson et al. | 20—56.5 |

HARRISON R. MOSELEY, *Primary Examiner.*

REINALDO P. MACHADO, *Examiner.*